US011912468B2

(12) United States Patent
Sprick et al.

(10) Patent No.: US 11,912,468 B2
(45) Date of Patent: *Feb. 27, 2024

(54) CLOSURE

(71) Applicant: Berry Global, Inc., Evansville, IN (US)

(72) Inventors: William D. Sprick, Evansville, IN (US); Mark A. Deutsch, Haubstadt, IN (US); Jason Bragg, Chandler, IN (US); Karla Koring, Mount Vernon, IN (US)

(73) Assignee: Berry Global, Inc., Evansville, IN (US)

( * ) Notice: Subject to any disclaimer, the term of this patent is extended or adjusted under 35 U.S.C. 154(b) by 217 days.

This patent is subject to a terminal disclaimer.

(21) Appl. No.: 17/320,840

(22) Filed: May 14, 2021

(65) Prior Publication Data

US 2021/0269203 A1 Sep. 2, 2021

Related U.S. Application Data

(63) Continuation of application No. 15/971,511, filed on May 4, 2018, now Pat. No. 11,040,807.

(Continued)

(51) Int. Cl.

| | |
|---|---|
| ***B65D 41/04*** | (2006.01) |
| ***A61J 7/00*** | (2006.01) |
| ***B65D 41/26*** | (2006.01) |
| ***B65D 41/34*** | (2006.01) |
| ***B65D 47/12*** | (2006.01) |
| ***B65D 47/40*** | (2006.01) |
| ***B65D 50/04*** | (2006.01) |
| ***B65D 51/18*** | (2006.01) |

(52) U.S. Cl.

CPC ....... *B65D 41/0414* (2013.01); *B65D 41/265* (2013.01); *B65D 41/3409* (2013.01); *B65D 47/123* (2013.01); *B65D 47/40* (2013.01); *B65D 50/046* (2013.01); *B65D 51/18* (2013.01); *A61J 7/0046* (2013.01); *B65D 50/041* (2013.01); *B65D 2251/0015* (2013.01); *B65D 2251/0087* (2013.01)

(58) Field of Classification Search

CPC .............. B65D 41/0414; B65D 41/265; B65D 41/3409; B65D 47/123; B65D 47/40; B65D 50/046; B65D 51/18

USPC .......................................................... 215/221

See application file for complete search history.

(56) References Cited

U.S. PATENT DOCUMENTS

| | | | |
|---|---|---|---|
| 2,601,040 | A | 6/1952 | Gould |
| 2,763,403 | A | 9/1956 | Livingstone |

(Continued)

FOREIGN PATENT DOCUMENTS

| | | | |
|---|---|---|---|
| DE | 8633922 | U1 | 4/1987 |
| GB | 2330135 | A1 | 4/1999 |

(Continued)

OTHER PUBLICATIONS

Second European Examination Report for European App. No. 18794388.1 dated Jul. 5, 2023, BP-519 EP || 7 pages.

(Continued)

*Primary Examiner* — James N Smalley

(74) *Attorney, Agent, or Firm* — Barnes & Thornburg LLP

(57) ABSTRACT

A package includes a container and a closure cap for mounting on the container. The closure cap is coupled to a neck of the container to block selectively removal of product stored within the container at the selection of a user.

18 Claims, 7 Drawing Sheets

Related U.S. Application Data

(60) Provisional application No. 62/501,430, filed on May 4, 2017.

(56) References Cited

U.S. PATENT DOCUMENTS

| | | | | | |
|---|---|---|---|---|---|
| 3,494,496 | A | | 2/1970 | Livingstone | |
| 4,133,462 | A | | 1/1979 | Lindstrom | |
| 4,830,234 | A | | 5/1989 | Odet | |
| 4,917,270 | A | | 4/1990 | Simon | |
| 5,101,993 | A | * | 4/1992 | Nairn | B65D 47/123 215/232 |
| 5,108,009 | A | * | 4/1992 | Davidson | B65D 41/265 222/571 |
| 5,251,788 | A | * | 10/1993 | Moore | B65D 47/123 222/111 |
| 5,785,196 | A | | 7/1998 | Montgomery | |
| 5,794,803 | A | * | 8/1998 | Sprick | B65D 41/265 215/217 |
| 7,097,076 | B1 | * | 8/2006 | Giblin | B65D 47/40 222/569 |
| 7,520,410 | B2 | * | 4/2009 | Gilbertson | B44D 3/128 222/542 |
| 8,011,535 | B2 | | 9/2011 | Tauber | |
| 9,371,165 | B2 | | 6/2016 | Brannon | |
| 10,259,617 | B2 | * | 4/2019 | Mélan-Moutet | B65D 41/325 |
| 2001/0027957 | A1 | * | 10/2001 | Kano | B65D 41/3428 215/354 |
| 2006/0131330 | A1 | | 6/2006 | Stebick | |
| 2006/0213860 | A1 | * | 9/2006 | Robinson | B65D 50/046 215/331 |
| 2007/0194047 | A1 | * | 8/2007 | Tauber | B65D 47/122 222/109 |
| 2008/0073382 | A1 | | 3/2008 | Higgins | |
| 2009/0223962 | A1 | * | 9/2009 | Szekely | B65D 47/061 220/288 |
| 2011/0309105 | A1 | | 12/2011 | Tauber | |
| 2015/0048113 | A1 | * | 2/2015 | Brannon | B65D 50/046 222/109 |
| 2015/0129534 | A1 | | 5/2015 | Falzoni | |
| 2017/0320631 | A1 | | 11/2017 | Sprick | |

FOREIGN PATENT DOCUMENTS

| | | | | | |
|---|---|---|---|---|---|
| JP | 3152639 | U1 | | 8/2009 | |
| WO | 0058169 | A1 | | 10/2000 | |
| WO | 2008028220 | A1 | | 3/2008 | |
| WO | WO-2014007141 | A1 | * | 1/2014 | B65B 47/06 |

OTHER PUBLICATIONS

First European Examination Report for European App. No. 18794388 dated Feb. 16, 2023, BP-519 EP || 9 pages.
International (PCT) Search Report and Written Opinion for PCT/US2018/031154 dated Jul. 30, 2018, BP-519 PCT ||, 7 pages.
Office Action dated Mar. 25, 2020, for U.S. Appl. No. 15/971,511 (pp. 1-11).
Office Action dated Jul. 7, 2020 for U.S. Appl. No. 15/971,511 (pp. 1-17).
Office Action dated Nov. 6, 2020 for U.S. Appl. No. 15/971,511 (pp. 1-16).
Extended European Search Report for European App. No. 18794388 dated Jan. 25, 2021, BP-519 EP ||, 8 pages.

* cited by examiner

CLOSURE

PRIORITY CLAIM

This application is a continuation of U.S. application Ser. No. 15/971,511, filed May 4, 2018, which claims priority under 35 U.S.C. § 119(e) to U.S. Provisional Application No. 62/501,430, filed May 4, 2017, each of which is expressly incorporated by reference herein.

BACKGROUND

The present disclosure relates to a container closure, and particularly to a closure for mounting on the top of a bottle or other container. More particularly, the present disclosure relates to a closure including a cap seal configured to engage the bottle or container to establish a seal with the bottle or container.

SUMMARY

According to the present disclosure, a closure includes a cap configured to couple selectively to a container to close an open mouth formed in the container. The cap includes a top wall, a side wall coupled to the top wall and arranged to extend downwardly from the top wall, and a thread coupled to the side wall and arranged to extend radially inward away from the side wall.

In illustrative embodiments, the closure further includes a cap seal. The cap seal is coupled to the top wall in spaced-apart radial relation to the thread and side wall. The cap seal is configured to establish a plug seal between the cap and the container in response to rotating the cap in a closure installation direction while applying a minimal downward force to the cap so that ease of installation is maximized.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
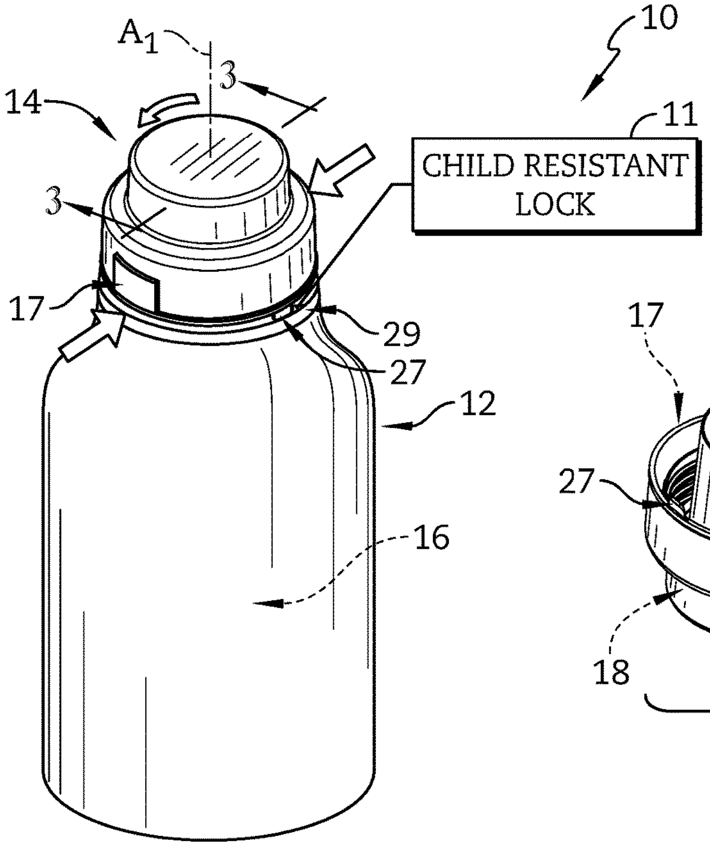
FIG. 1 is a perspective view of a package including one embodiment of a closure cap in accordance with the present disclosure showing the closure cap mounted on a container and suggesting that a child-resistant lock is formed between the container and closure cap to block selectively removal of the closure cap at the selection of an adult user.
Figure 3:
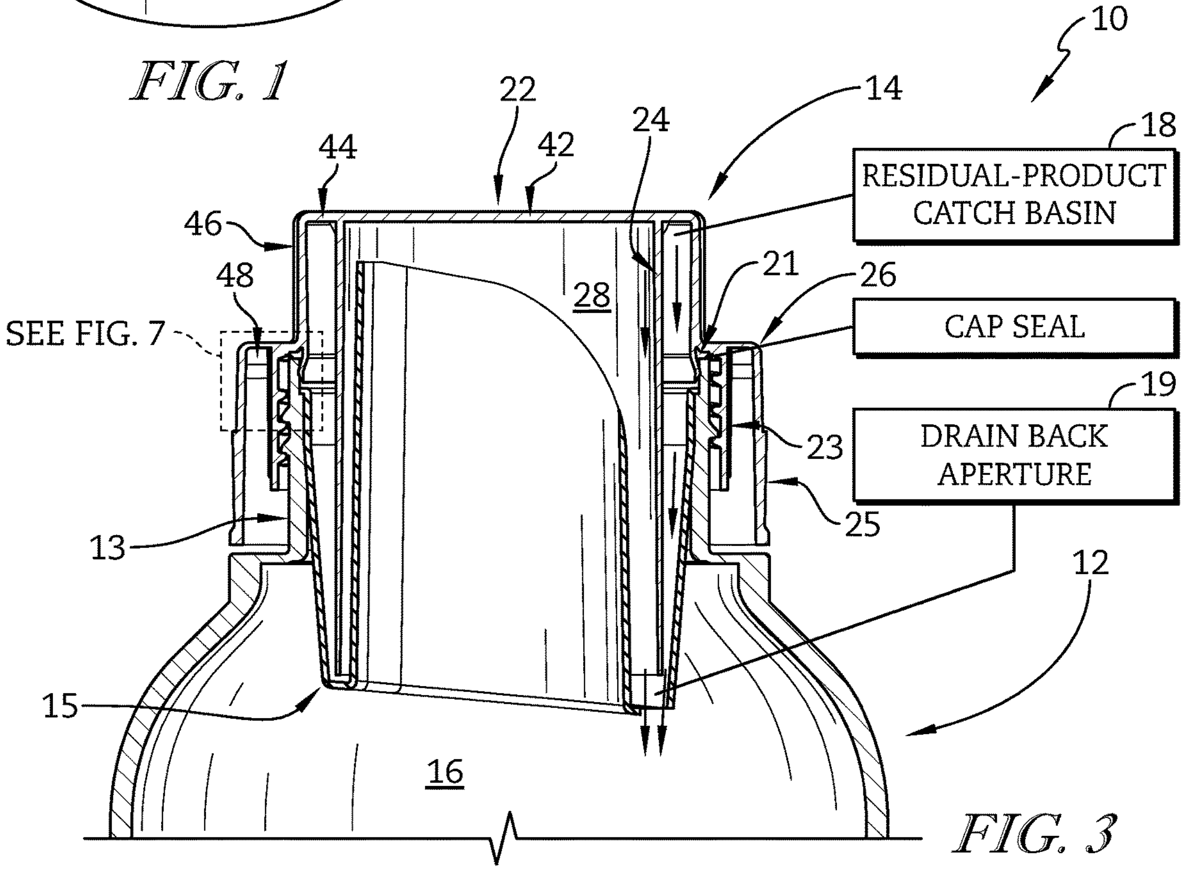
Figure 4:
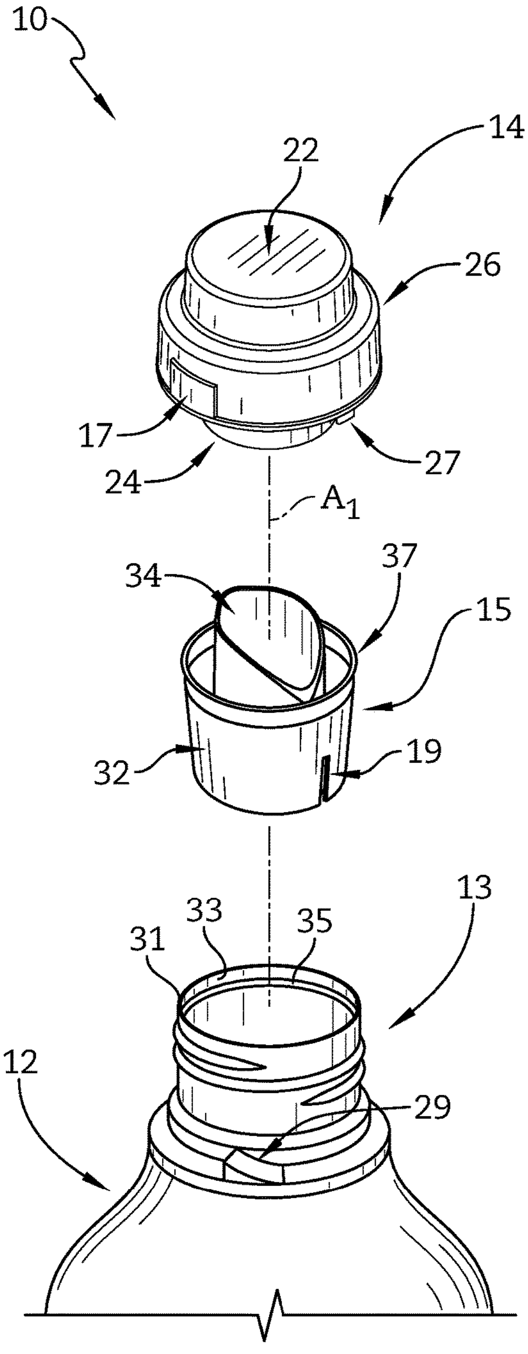
Figure 5:
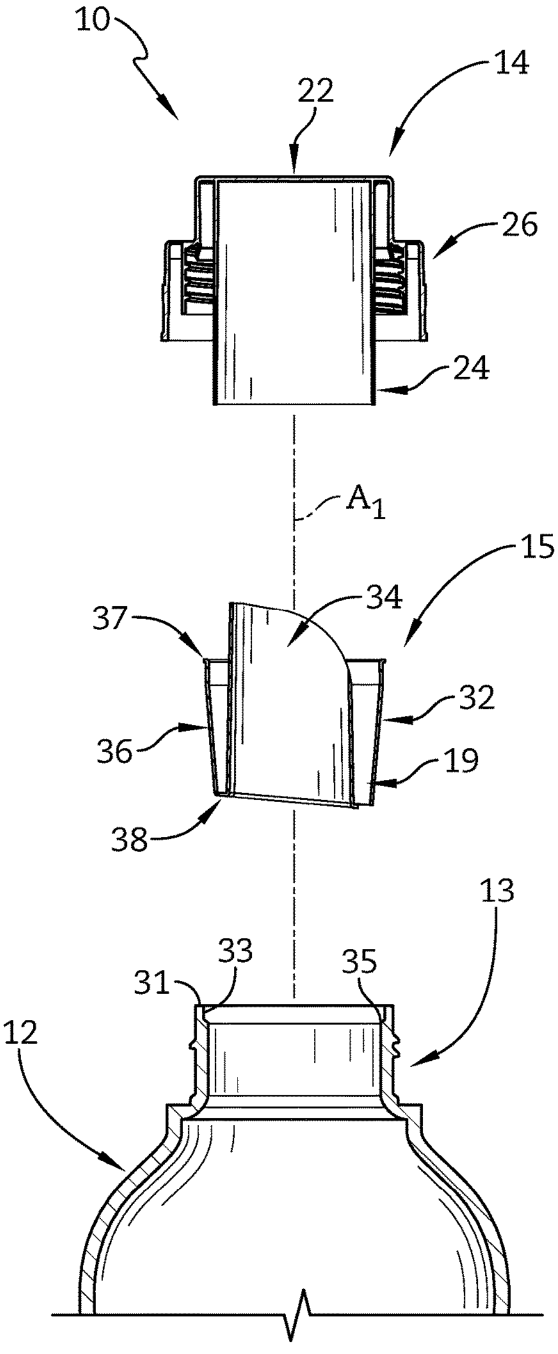
Figure 6:
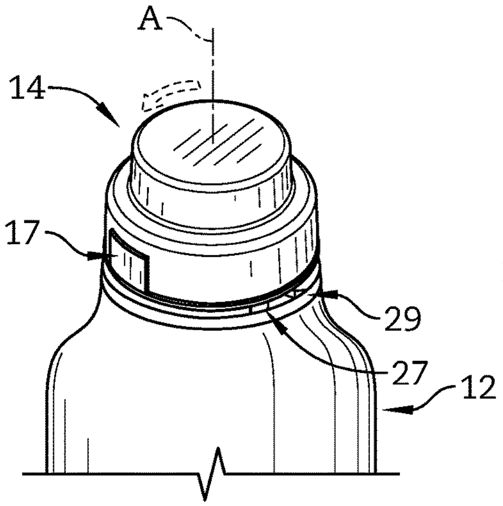
Figure 7:
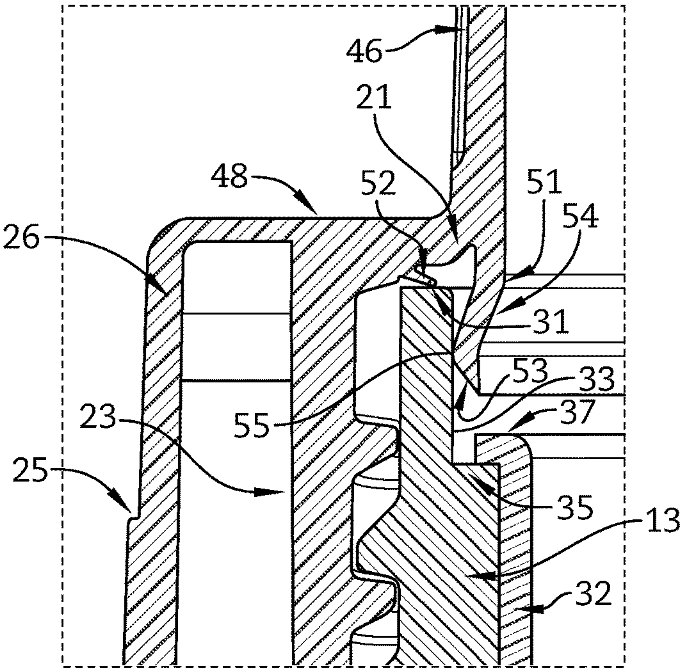
Figure 8:
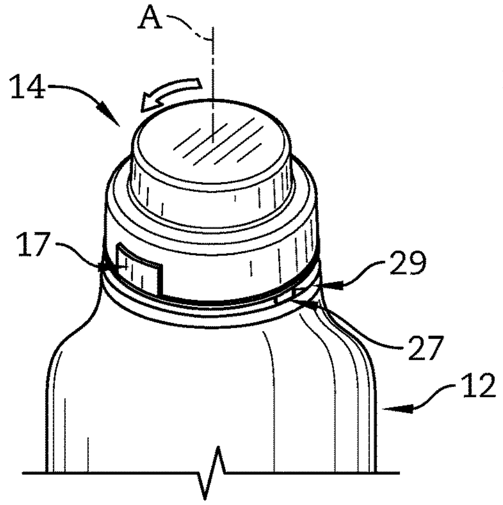
Figure 9:
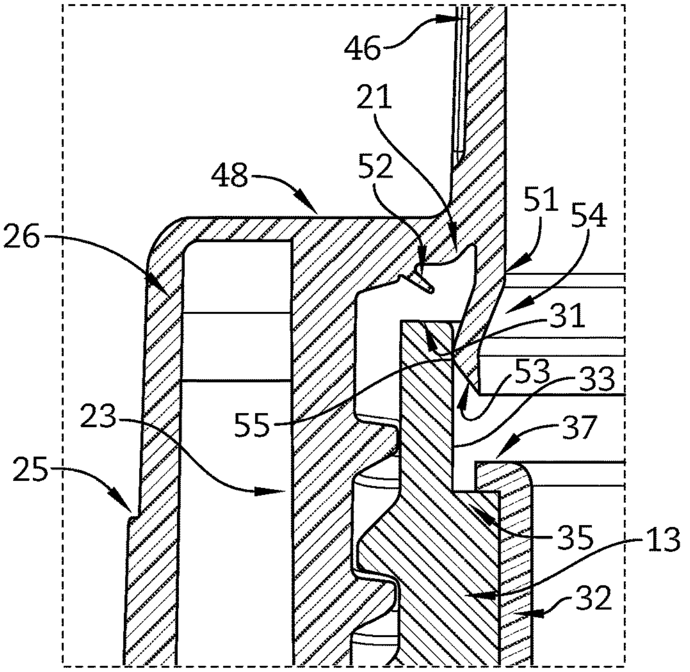
Figure 10:
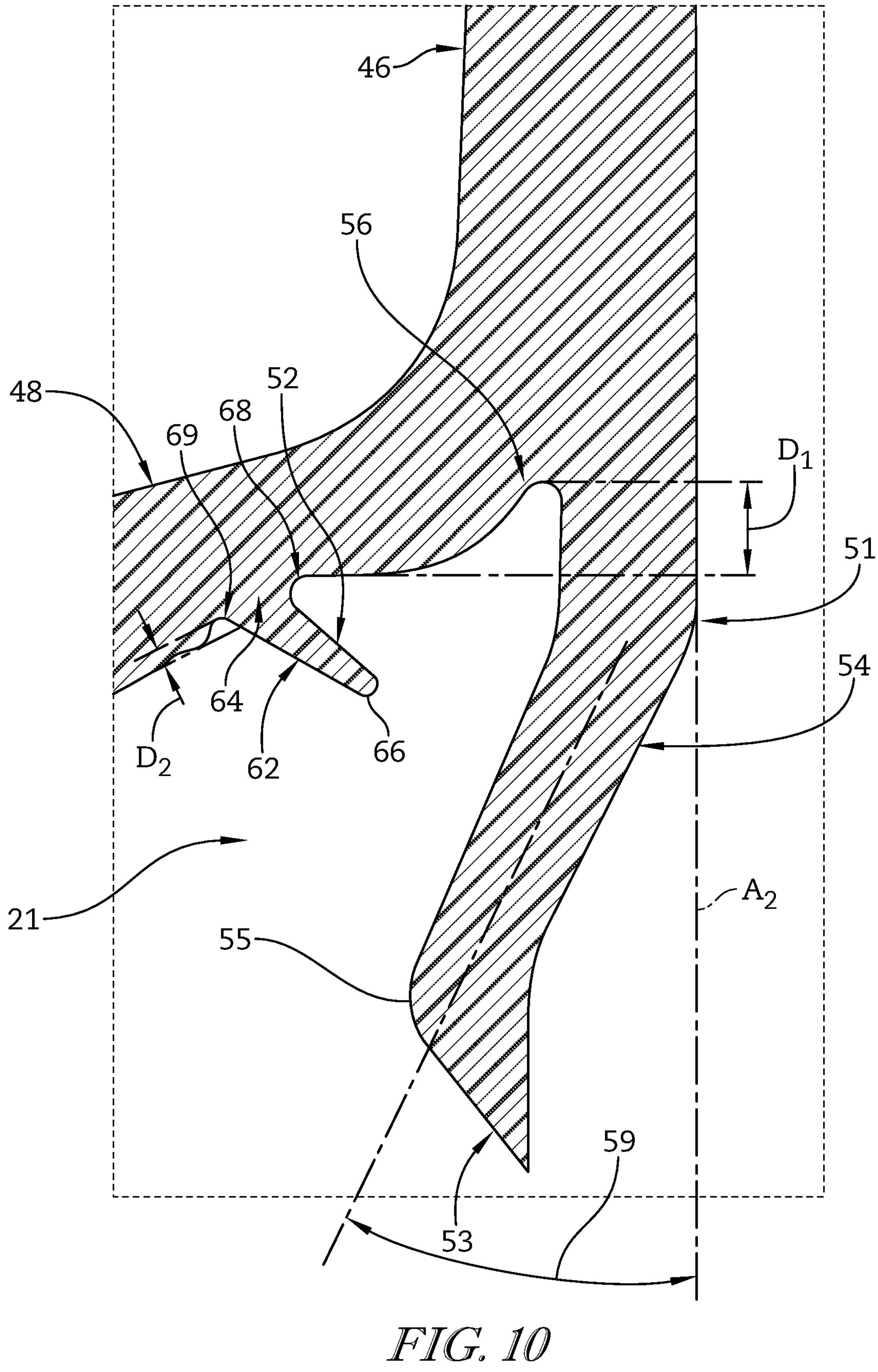
Figure 11:
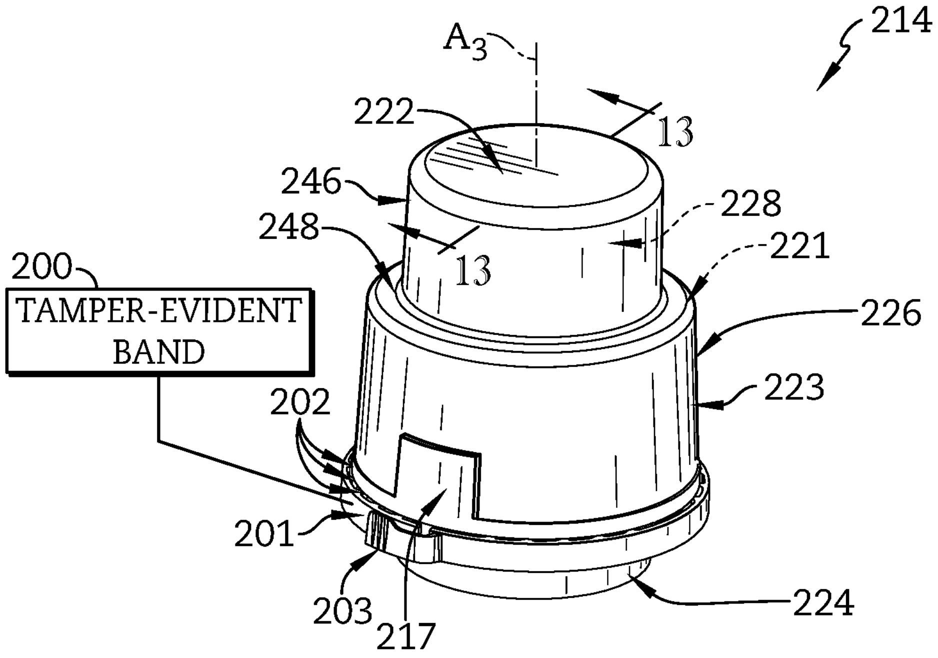
Figure 12:
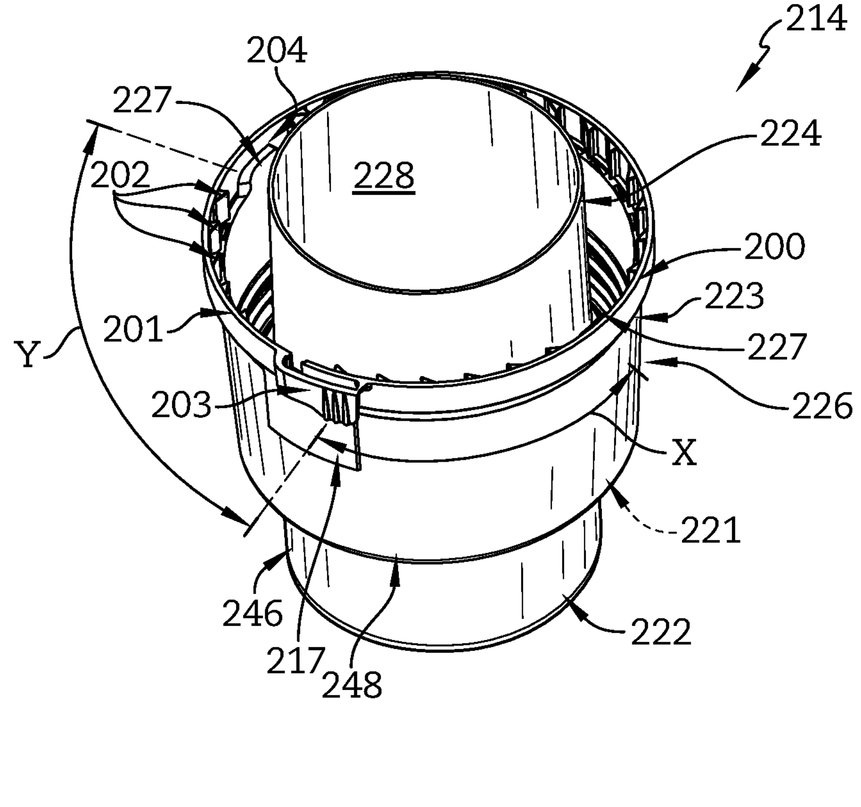
Figure 13:
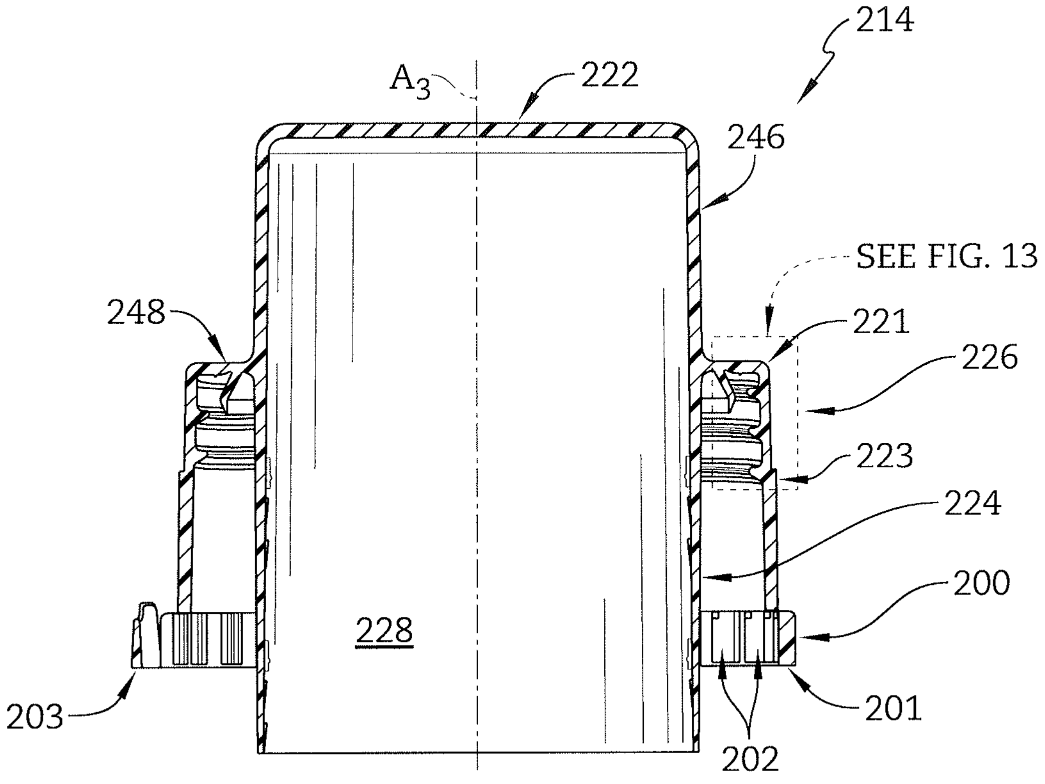
Figure 14:
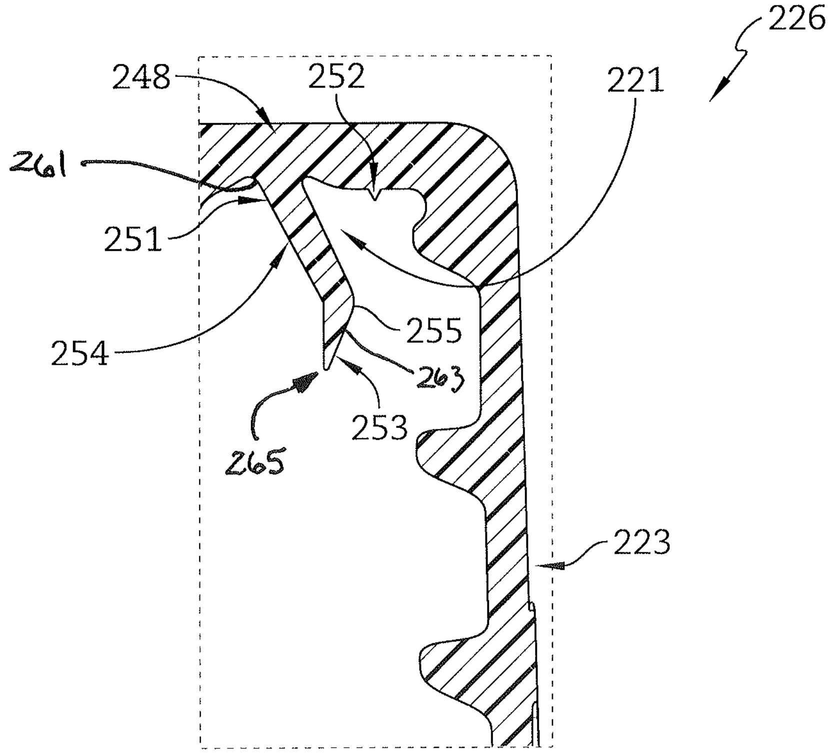
Figure 15:
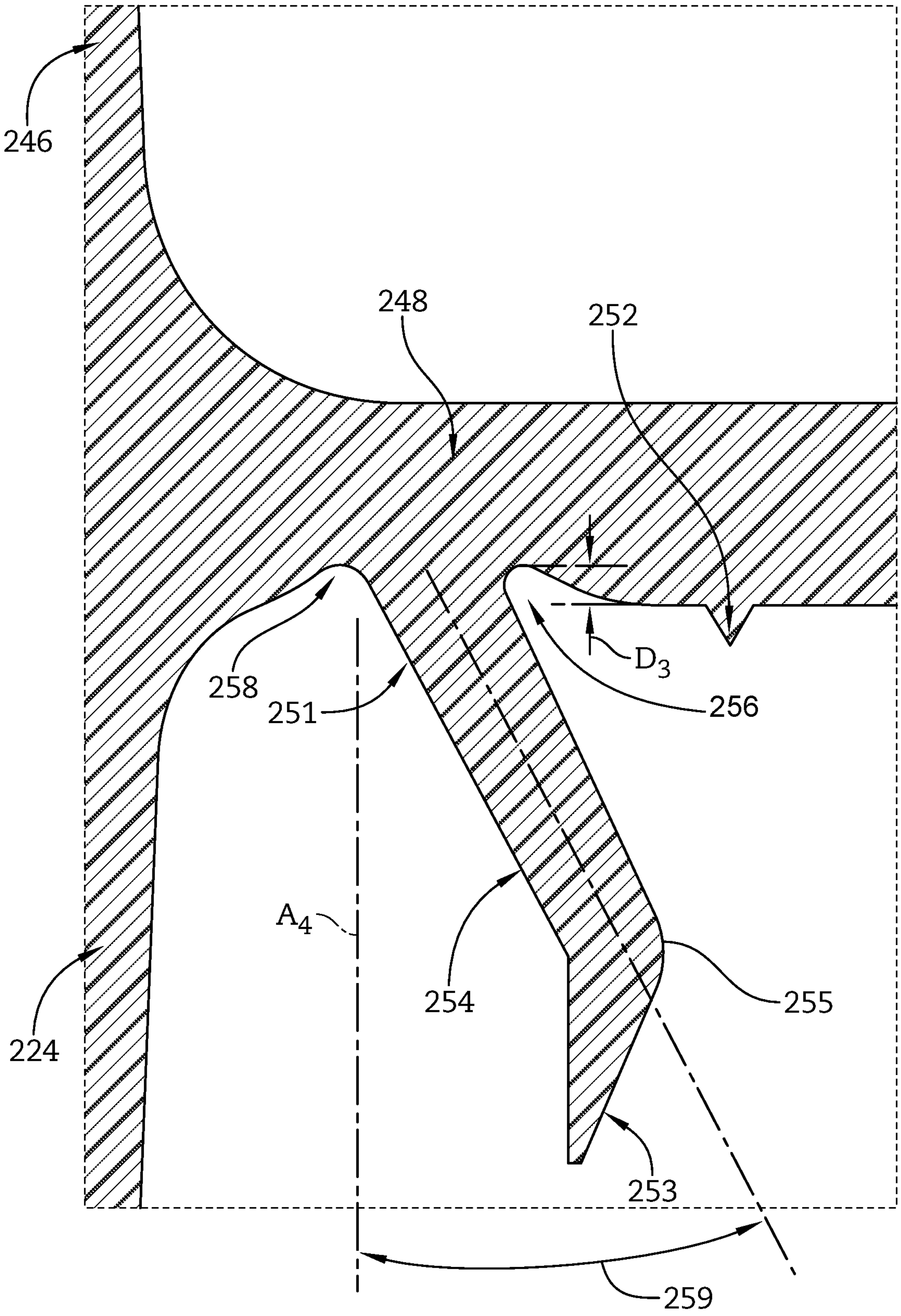

FIG. 3 is a partial sectional view taken along line 3-3 of FIG. 1 showing the closure cap mounted on a neck of the container and suggesting that a seal is established between the cap and the container to block removal of product stored in the container and showing that a residual-product catch basin of the closure cap collects excess product remaining on an exterior surface of the product measuring cup after a user discharges product from the container into the product measuring cup and directs the excess product toward a product-drainback aperture to re-enter the container;

FIG. 4 is an exploded assembly view of the package of FIG. 1 showing that a pour-spout insert includes the discharge tube, a product drainback cup coupled to the discharge tube, and the product-drainback aperture formed in a lower portion of the product drainback cup and suggesting that the pour-spout insert is received in the neck of the container to couple the pour-spout insert to the container;

FIG. 5 is a sectional exploded assembly view of the package of FIG. 4 showing that the product drainback cup of the pour-spout insert is sized to extend into the neck of the container and that the product measuring cup is sized to receive the discharge tube of the pour-spout insert when the pour-spout insert and closure cap are mounted on the container;

FIG. 6 is an enlarged view of the package of FIG. 1 showing the closure cap rotated relative to the container to a first angular position such that the lock tab is spaced apart from the tab blocker;

FIG. 7 is an enlarged view of the package of FIG. 3 showing that a spout sealer of the closure cap includes an annular plug wall and an annular rim sealer and suggesting that the plug wall engages with an interior surface of the neck of the container to form a plug seal with the container and that the rim seal engages with a rim of the neck to form a seal along the rim when the closure cap is mounted on the container in the first angular position;

FIG. 8 is a view similar to FIG. 6 showing the closure cap rotated relative to the container to a second angular position such that the lock tab is engaged with the tab blocker;

FIG. 9 is a view similar to FIG. 7 showing the plug wall engaged with the interior surface of the neck and the rim sealer spaced apart from the rim of the neck when the closure cap is mounted on the container in the second angular position shown in FIG. 8;

FIG. 10 is an enlarged view of the cap seal of FIG. 9 showing that a top wall of the closure cap is formed to include an annular groove having a depth ($D_1$) that maximizes the flexibility of the plug wall to allow engagement with necks of varying inner diameters;

FIG. 11 is a perspective view of another embodiment of a closure cap in accordance with the present disclosure showing that the closure cap includes a product measuring cup, an outer shell extending around the product measuring cup, and a tamper-evident band coupled to a lower perimeter of the outer shell by a frangible connection;

FIG. 12 is a lower perspective view of the closure cap of FIG. 11 showing that the tamper-evident band includes a strip and a plurality of directionally molded retention tabs spaced around an inner perimeter of the strip and suggesting that the retention tabs engage with the container to block rotation of the closure cap at the selection of a user;

FIG. 13 is a sectional view taken along line 13-13 in FIG. 11 showing that a spout sealer is coupled to the outer shell;

FIG. 14 is an enlarged view of the closure cap of FIG. 13 showing that the spout sealer of the closure cap includes an annular plug wall and an annular rim sealer; and FIG. 15 is an enlarged view of the cap seal of FIG. 14 showing that a top wall of the closure cap is formed to include an annular groove having a depth ($D_3$) that maximizes the flexibility of the plug wall to allow engagement with necks of varying inner diameters.

DETAILED DESCRIPTION

A package 10 in accordance with the present disclosure is shown in FIG. 1. Package 10 includes a container 12 and one embodiment of a closure cap 14 in accordance with the present disclosure configured to mount on container 12 along an axis $A_1$. A child-resistant lock 11 is formed between closure cap 14 and container 12 to block removal of closure cap 14 at the selection of an adult user. An adult user engages one or more pads 17 on closure cap 14 to disengage child-resistant lock 11 and allow removal of closure cap 14 from container 12. Dismounting closure cap 14 from container 12 allows liquid or solid product stored in an internal volume 16 of container 12 to be dispensed through an optional pour-spout insert 15 coupled to container 12 as suggested in FIG. 2. Closure cap 14 forms a cap seal with container 12 to block removal of the product when closure cap 14 is mounted on container 12 and to allow residual product captured in a residual-product catch basin 18 of closure cap 14 to flow back into container 12 through a drainback aperture 19 as suggested in FIG. 3.

Figure 2:
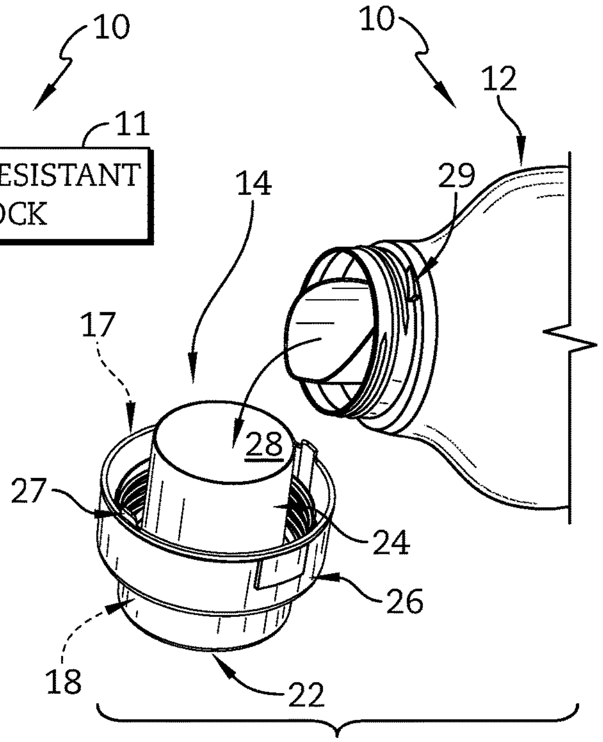
FIG. 2 is a partial perspective view of the package of FIG. 1 showing the closure cap removed from the container and suggesting that product stored within the container is poured through a discharge tube at the selection of a user into a product measuring cup of the closure cap to measure an amount of product discharged from the container.

Closure cap 14 includes a top wall 22, an annular inner sleeve 24 extending downwardly from top wall 22, and an outer shell 26 coupled to top wall 22 and arranged to extend around inner sleeve 24 as suggested in FIGS. 2 and 3. Inner sleeve 24 and top wall 22 cooperate to form a product measuring cup formed to include a product-receiving region 28 for receiving product to be measured by a consumer after removal of closure cap 14 from container 12 as suggested in FIG. 2. Residual product not dispensed from closure cap 14 flows along inner sleeve 24 toward top wall 22 while closure cap 14 is in a generally upright position, shown in FIG. 2, and is collected inside product-receiving region 28 and residual-product catch basin 18 along top wall 22.

Outer shell 26 includes a spout sealer 21, an annular inner sidewall 23, and an annular outer sidewall 25 as shown, for example, in FIG. 3. Spout sealer 21 is configured to engage with a neck 13 of container 12 to form the cap seal around pour-spout insert 15. Inner sidewall 23 of closure cap 14 is configured to engage with neck 13 of container 12 to hold closure cap 14 on container 12. Outer sidewall 25 is arranged to extend around inner sidewall 23. In the illustrative embodiment, outer sidewall 25 is formed to include pad 17.

Child-resistant lock 11 includes a lock tab 27 coupled to outer sidewall 25 of closure cap 14 and a companion stationary tab blocker 29 coupled to container 12 as suggested in FIGS. 1 and 2. Tab blocker 29 engages with lock tab 27 to block rotation of closure cap 14 relative to container 12 about axis A to block removal of closure cap 14. An adult user engages pad 17 of outer sidewall 25 to move lock tab 27 radially outward relative to tab blocker 29 to remove lock tab 27 from engagement with tab blocker 29 and allow removal of closure cap 14 from container 12 as suggested in FIG. 1. In some embodiments, a secondary lock tab and a secondary tab blocker are included as part of child-resistant lock 11. In some embodiments, outer sidewall 25 is formed to include a second pad opposite pad 17.

Pour-spout insert 15 is received in neck 13 of container 12 and closure cap 14 is arranged to cover pour-spout insert 15 when mounted on container 12 as suggested in FIGS. 4 and 5. Pour-spout insert 15 includes a product drainback cup 32 and a discharge tube 34 coupled to product drainback cup 32. Product drainback cup 32 includes an annular wall 36 and a bottom wall 38 coupled between annular wall 36 and discharge tube 34. In the illustrative embodiment, drainback aperture 19 is formed through a portion of annular wall 36 and a portion of bottom wall 38. In some embodiments, drainback aperture 19 is formed only through a portion of annular wall 36. In some embodiments, drainback aperture 19 is formed only through a portion of bottom wall 38.

Product drainback cup 32 of pour-spout insert 15 is configured to engage with neck 13 to hold pour-spout insert 15 on container 12 as suggested in FIGS. 3-5. Neck 13 includes an upper rim 31, an inner sealer wall 33, and a shoulder 35. A cup support 37 extends radially outward from an upper perimeter of product drainback cup 32 to engage with shoulder 35 of neck 13 to hold pour-spout insert 15 to container 12. In some embodiments, pour-spout insert 15 is press fit into neck 13. In some embodiments, pour-spout insert 15 is spun welded against neck 13. Discharge tube 34 of pour-spout insert 15 is configured to allow a user to pour product from container 12. Product drainback cup 32 of pour-spout insert 15 is configured to collect and direct residual product back into container 12 through drainback aperture 19. In the illustrative embodiment, bottom wall 38 is sloped toward drainback aperture 19 as suggested in FIG. 3.

Top wall 22 of closure cap 14 includes a spout cover 42 and a spacer wall 44 as shown in FIG. 3. Spout cover 42 and inner sleeve 24 define product-receiving region 28. An annular outer sleeve 46 extends downward from spacer wall 44 to couple outer shell 26 with top wall 22. Outer sleeve 46 is spaced apart radially from inner sleeve 24. Outer sleeve 46, inner sleeve 24, and spacer wall 44 together define residual-product catch basin 18.

Spout sealer 21, inner sidewall 23, and outer sidewall 25 of outer shell 26 are coupled to an annular top wall 48 extending radially outward from outer sleeve 46 as suggested in FIG. 7. Inner sidewall 23 is spaced radially outward from spout sealer 21, and outer sidewall is spaced radially outward from inner sleeve 24. Spout sealer 21 includes an annular rim sealer 52 and an annular plug wall 54. Rim sealer 52 engages with rim 31 of neck 13 to form a contact seal with neck 13, as suggested in FIG. 7, when closure cap 14 is in a first angular position relative to container 12 as shown in FIG. 6. While spout sealer 21 is shown as including both annular rim sealer 52 and annular plug wall 54, annular rim sealer 52 may omitted from the spout sealer. Closure cap 14 can be formed without rim sealer 52 if the additional seal is not needed for certain applications. In the illustrative embodiment, lock tab 27 is spaced apart from tab blocker 29 when closure cap 14 is in the first angular position.

Plug wall 54 includes a flex section 51 and a plug mover 53 coupled to flex section 51 as suggested in FIG. 7. A sealer face 55 is defined along an outer perimeter of plug wall 54. Flex section 51 is coupled to annular top wall 48 and configured to allow plug wall 54 to flex relative to annular top wall 48. Plug mover 53 is configured to engage with neck 13 as closure cap 14 is being mounted on a neck finish of container 12 to flex plug wall 54 radially inward. Sealer face 55 of plug wall 54 engages with sealer wall 33 of neck 13 to form a plug seal. Rim sealer 52 becomes spaced apart from rim 31 and sealer face 55 remains engaged with sealer wall 33, as suggested in FIG. 9, as closure cap 14 rotates relative to container 12 from the first angular position to a second angular position as shown in FIG. 8. In the illustrative embodiment, lock tab 27 is engaged with tab blocker 29 when closure cap 14 is in the second angular position.

In the illustrative embodiment, an annular groove 56 is formed into top wall 48 adjacent to plug wall 54 as shown in FIG. 10. Groove 56 extends into top wall 48 to a depth $D_1$ and maximizes the flexibility of plug wall 54 to allow engagement with necks 13 of varying inner diameters. In some embodiments, depth $D_1$ is about 0.001 inches to about 0.25 inches. In some embodiments, depth $D_1$ is about 0.05 inches to about 0.1 inches. Depth $D_1$ can be adjusted to adjust an overall length of plug wall 54. Torque applied to plug wall 54 increases as depth $D_1$ increases, thereby minimizing vertical installation force applied by a user to closure cap 14.

In the illustrative embodiment, at least a portion of plug wall 54 is disposed at an angle 59 relative to an axis $A_2$ (parallel to installation axis $A_1$) as shown in FIG. 10. Angle 59 allows plug wall 54 to engage with necks 13 of varying inner diameters. In some embodiments, angle 59 is about 60 degrees to about 85 degrees. In some embodiments, angle 59 is about 70 degrees to about 80 degrees.

Rim sealer 52 includes a body 62 coupled at a base 64 to top wall 48 and extending out to a tip 66 as shown in FIG. 10. In the illustrative embodiment, top wall 48 is further formed to include an inner annular rim groove 68 and an outer annular rim groove 69. Inner rim groove 68 is located between plug wall 54 and rim sealer 52. Rim sealer 52 is located between inner rim groove 68 and outer rim groove 69. In one example, inner and outer rim grooves 68, 69 have a depth $D_2$ into top wall 48 of about 0.001 inches and 0.02 inches. In another example, depth $D_2$ is about 0.01 inches to about 0.02 inches. Inner and outer rim grooves 68, 69 cooperate to maximize a length of rim sealer 52 which maximizes torque applied to rim sealer 52 during installation thereby minimizing vertical installation forced applied by the user. In some embodiments, inner and outer rim grooves 68, 69 have the same depth $D_2$. In some embodiments, inner and outer rim grooves 68, 69 have different depths $D_2$ relative to one another. Depth $D_2$ can be adjusted to adjust an overall length of rim sealer 52. Torque applied to rim sealer 52 increases as depth $D_2$ increases, thereby minimizing vertical installation force applied by a user to closure cap 14.

Another embodiment of a closure cap 214 in accordance with the present disclosure is shown in FIGS. 11 and 12. Closure cap 214 is configured to mount on container, such as container 12 of FIGS. 1-10, along an axis $A_3$. A tamper-evident band 200 is coupled to a lower perimeter edge of closure cap 214 by a frangible connection. A user removes tamper-evident band 200 along the frangible connection to allow closure cap 214 to dismount from the container.

Tamper-evident band 200 includes a strip 201 and a plurality of directionally molded retention tabs 202 spaced around an inner perimeter of strip 201 as shown in FIG. 12. Retention tabs 202 are configured to engage with the container when closure cap 214 is mounted thereon to block rotation and removal of closure cap 214 at the selection of a user. In the illustrative embodiment, retention tabs 202 are coupled along a lower perimeter edge of an annular sidewall 223 of closure cap 214 to form the frangible connection. A tear-away handle 203 is coupled to strip 201. A user engages tear-away handle 203 and pulls radially outward to remove strip 201 from closure cap 214 along the frangible connection. In some embodiments, tamper-evident band 200 is a break-torque band where rotation of closure cap 214 breaks the frangible connection with annular sidewall 223.

Closure cap 214 includes a top wall 222, an annular sleeve 224 extending downwardly from top wall 222, and an outer shell 226 arranged to extend around sleeve 224 as suggested in FIGS. 11 and 12. Sleeve 224 and top wall 222 cooperate to form a product measuring cup formed to include a product-receiving region 228 for receiving product to be measured by a consumer after removal of closure cap 214 from the container. Outer shell 226 includes a spout sealer 221 and the annular sidewall 223. An annular top wall 248 extends radially outward from sleeve 224 to couple outer shell 226 with sleeve 224 as suggested in FIG. 13. Spout sealer 221 is configured to engage with a neck of the container to form a cap seal to block removal of product within the container while closure cap 214 is mounted on the container. Annular sidewall 223 of closure cap 214 is configured to engage with the neck of the container to hold closure cap 214 on the container. An upper portion 246 of sleeve 224 forms a grip for handling closure cap 214.

A lock tab 227 is coupled to a lower perimeter edge of annular sidewall 223 and is configured to engage with a companion stationary tab blocker coupled to the container as part of a child-resistant lock as suggested in FIG. 12. A gap 204 is formed between at least some of retention tabs 202 on strip 201 so that tamper-evident band 200 does not engage lock tab 227. Lock tab 227 engages with the tab blocker to block rotation of closure cap 214 relative to the container about axis $A_3$ to block removal of closure cap 214. An adult user engages a pad 217 of annular sidewall 223 to move lock tab 227 radially outward relative to the tab blocker to remove lock tab 227 from engagement with the tab blocker and allow removal of closure cap 214 from the container. In some embodiments, a secondary lock tab 227 and a secondary tab blocker are included as part of the child-resistant lock. In the illustrative embodiment, pad 217 is angularly spaced from one of the lock tabs 227 by an angle Y and from the other of the lock tabs 227 by an angle X. In some embodiments, angle Y and angle X are equal. In some embodiments, angle Y is larger than angle X. In some embodiments, angle X is larger than angle Y. In some embodiments, angle Y is about 90 degrees. In some embodiments, angle Y is less than about 90 degrees. In some embodiments, angle Y is about 45 degrees. In some embodiments, angle X is about 90 degrees. In some embodiments, angle X is less than about 90 degrees. In some embodiments, angle X is about 45 degrees.

Spout sealer 221 includes an annular rim sealer 252 and an annular plug wall 255 as shown in FIG. 14. While spout sealer 221 is shown as including both annular rim sealer 252 and annular plug wall 254, annular rim sealer 252 may omitted from the spout sealer. Closure cap 214 can be formed without rim sealer 252 if the additional seal is not needed for certain applications. Rim sealer 252 engages with a rim of the neck of the container to form a contact seal with the neck. Plug wall 254 includes a free end 265, a flex section 251 and a plug mover 253 coupled to flex section 251. A sealer face 255 is defined along an outer perimeter of plug wall 254. Flex section 251 is coupled to second annular top wall 248 and configured to allow plug wall 254 to flex relative to second annular top wall 248. Plug mover 253 is configured to engage with the neck as closure cap 214 is being mounted on the container to flex plug wall 254 radially inward. Sealer face 255 of plug wall 254 engages with the neck to form a plug seal. In some embodiments, sealer face 255 remains engaged with the neck as rim sealer 252 becomes spaced apart from the rim of the neck as closure cap 214 is rotated relative to the container.

In the illustrative embodiment, second annular top wall 248 is further formed to include an inner annular plug groove 258 and an outer annular plug groove 256 as shown in FIG. 15. Inner plug groove 258 is located between sleeve 224 and plug wall 254. Plug wall 254 is located between inner plug groove 258 and outer plug groove 256. In one example, inner and outer plug grooves 258, 256 have a depth $D_3$ into second annular top wall 248 of about 0.001 inches and 0.02 inches. In another example, depth $D_3$ is about 0.01 inches to about 0.02 inches. Inner and outer plug grooves 258, 256 cooperate to maximize a length of plug wall 254 which maximizes torque applied to plug wall 254 during installation thereby minimizing vertical installation forced applied by the user. Inner and outer plug grooves 258, 256 effectively increase the length of the plug wall 254 without requiring plug wall 254 to extend further into the container. The additional length of plug wall 254 increases the flexibility of plug wall 254 by increasing the mechanical advantage due to an increase in length from a base 261 of plug wall 254 to a sloped face 263 of plug mover 25. In some embodiments, inner and outer plug grooves 258, 256 have the same depth $D_3$. In some embodiments, inner and outer plug grooves 258, 256 have different depths $D_3$ relative to one another. Inner and outer grooves 258, 256 maximize the flexibility of plug wall 254 to allow engagement with container necks of varying inner diameters. Depth $D_3$ can be adjusted to adjust an overall length of plug wall 254. Torque applied to plug wall 254 increases as depth $D_3$ increases, thereby minimizing vertical installation force applied by a user to closure cap 214.

In the illustrative embodiment, at least a portion of plug wall 254 is disposed at an angle 259 relative to an axis $A_4$ (parallel to installation axis $A_3$) as shown in FIG. 15. Angle 259 allows plug wall 254 to engage with container necks of varying inner diameters. In some embodiments, angle 259 is about 50 degrees to about 80 degrees. In some embodiments, angle 259 is about 50 degrees to about 70 degrees.

In some embodiments, tamper-evident band 200 is included in closure cap 14 and coupled to a lower perimeter edge of annular outer sidewall 25. In some embodiments, closure cap 214 includes a residual-product catch basin similar to residual-product catch basin 18 shown in FIG. 3. In some embodiments, closure caps 14, 214 are formed from substantially rigid and resilient materials, such as plastic for example. In some embodiments, other types of connections are used in place of threaded connections, such as lock and key or groove and tab arrangements for example.

In one example, a tamper-evident band is a tear-away tamper-evident band as shown in FIG. 10. In another example, the tamper evident band is a snap-away tamper-evident band. Any suitable tamper-evident band may be used with the present disclosure.

The invention claimed is:

1. A closure comprising a first top wall, a first side wall coupled to the first top wall and arranged to extend away from the first top wall, and an annular sleeve spaced radially inward from the first side wall relative to a vertical axis of the closure and arranged to extend downwardly from the first top wall, a second top wall extending radially outward from the first side wall and a second side wall coupled to the second top wall and arranged to extend away from the second top wall, a third side wall coupled to an outer edge of the second top wall and spaced apart radially outward from the second side wall, and wherein a lock tab is coupled to a lower end of the third side wall and arranged to extend downwardly from the third side wall beyond a lower edge of the third side wall to engage a companion stationary tab blocker coupled to a container to block rotation of the closure relative to the container, and a spout sealer including a rim sealer and an annular plug wall spaced radially inward from the rim sealer relative to the vertical axis, the annular plug wall extending axially downwardly and radially outwardly from an inside surface of the second top wall between the second side wall and the annular sleeve, the annular plug wall being spaced apart radially from the annular sleeve relative to the vertical axis and including a flex section and a plug mover that extends downwardly from the flex section.

2. The closure of claim 1, wherein a base of the annular plug wall is coupled to the second top wall and aligned radially with the first side wall relative to the vertical axis of the closure.

3. The closure of claim 2, wherein a radially inner surface of the first side wall is aligned radially with a radially inner surface of the base.

4. The closure of claim 1, wherein a finger pad is formed on the third side wall and is spaced circumferentially from the lock tab.

5. The closure of claim 1, wherein the annular plug wall includes a sealer face positioned between the flex section and the plug mover, the sealer face being adapted to extend radially outwardly from a sloped face of the plug mover.

6. The closure of claim 5, wherein the annular plug wall includes a free end that is positioned radially outward from the base.

7. The closure of claim 6, wherein the free end of the annular plug wall is positioned radially inward of the sealer face.

8. A closure comprising a first top wall, a first side wall coupled to the first top wall and arranged to extend away from the first top wall, and an annular sleeve spaced radially inward from the first side wall relative to a vertical axis of the closure and arranged to extend downwardly from the first top wall to define a residual-product catch basin between the first side wall and the annular sleeve, a second top wall extending radially outward from the first side wall and a second side wall coupled to the second top wall and arranged to extend downward away from the second top wall, a third side wall coupled to an outer edge of the second top wall and spaced apart radially outward from the second side wall, and wherein a lock tab is coupled to the third side wall to provide a portion of a child-resistant lock, the lock tab extending downwardly from the third side wall beyond a lower edge of the third side wall, and an annular plug wall extending axially downwardly and radially outwardly from an inside surface of the second top wall between the second side wall and the annular sleeve, the annular plug wall being spaced apart radially from the annular sleeve relative to the vertical axis and including a flex section and a plug mover that extends downwardly from the flex section.

9. The closure of claim 8, wherein the annular plug wall is arranged to lie radially between the residual-product catch basin and the second side wall.

10. The closure of claim 9, wherein the annular plug wall is at least partially aligned radially with the first side wall to define a portion of the residual-product catch basin between the annular plug wall and the annular sleeve.

11. The closure of claim 9, wherein a radially inner surface of the first side wall is aligned radially with a radially inner surface of a base of the annular plug wall coupled to the second top wall.

12. The closure of claim 8, further comprising a spout sealer coupled to the inside surface of the second top wall and arranged to lie radially between the annular plug wall and the second side wall.

13. The closure of claim 12, wherein the spout sealer is spaced radially from both the annular plug wall and the second side wall.

14. The closure of claim 8, wherein a finger pad is formed on the third side wall and is spaced circumferentially from the lock tab.

15. The closure of claim 8, wherein the annular plug wall includes a sealer face positioned between the flex section and the plug mover, the sealer face being adapted to extend radially outwardly from a sloped face of the plug mover.

16. The closure of claim 15, wherein the annular plug wall includes a free end that is positioned radially outward from the base and the free end of the annular plug wall is positioned radially inward of the sealer face.

17. The closure of claim 1, wherein the first side wall has a height and the first side wall extends parallel to the vertical axis of the closure along an entirety of the height of the first side wall.

18. The closure of claim 8, wherein the lock tab of the closure is adapted to engage a companion stationary tab blocker coupled to a container in a fixed position to selectively block rotation of the closure relative to the container to block removal of the closure from the container.

* * * * *